United States Patent [19]

Gukelberger, Jr. et al.

[11] 3,903,324

[45] Sept. 2, 1975

[54] METHOD OF CHANGING THE PHYSICAL PROPERTIES OF A METALLIC FILM BY ION BEAM FORMATION

[75] Inventors: Thomas F. Gukelberger, Jr., Hopewell Junction; Walter J. Kleinfelder, Fishkill, both of N.Y.

[73] Assignee: International Business Machines Corporation, Armonk, N.Y.

[22] Filed: June 19, 1972

[21] Appl. No.: 264,130

Related U.S. Application Data

[62] Division of Ser. No. 889,242, Dec. 30, 1969, Pat. No. 3,682,729.

[52] U.S. Cl. ...................... 427/88; 427/85; 427/89; 427/90; 427/123

[51] Int. Cl.$^{2}$........................ B44D 1/14; B44D 1/02

[58] Field of Search ............ 117/62, 217, 212, 93.3, 117/227; 317/235 AY

[56] References Cited

UNITED STATES PATENTS

| | | | |
|---|---|---|---|
| 3,341,352 | 9/1967 | Ehlers | 117/93.3 |
| 3,341,754 | 9/1967 | Kellett et al. | 317/235 AY |
| 3,540,925 | 11/1970 | Athanas et al. | 117/93.3 |
| 3,558,366 | 1/1971 | Lepselter | 317/235 AY |
| 3,562,022 | 2/1971 | Shifrin | 117/93.3 |
| 3,622,382 | 11/1971 | Brack | 317/235 AY |
| 3,635,767 | 1/1972 | Tsuchimoto | 317/235 AY |
| 3,666,548 | 5/1972 | Brack et al. | 117/93.3 |

*Primary Examiner*—Cameron K. Weiffenbach
*Attorney, Agent, or Firm*—Frank C. Leach, Jr.; George O. Saile; Thomas F. Galvin

[57] ABSTRACT

A deposited metallic film on a substrate is bombarded with high energy ions having an energy of at least 10 Kev with the ions being selected from the group of ions ranging between helium and argon. The selected ions depend upon the metal forming the film and the thickness of the film. This bombardment reduces the yield stress of the film in any area in which the ions strike and is particularly useful to form metallic lands on a semiconductor substrate.

6 Claims, 8 Drawing Figures

10,000X (75° ANGLE)

1800X (75° ANGLE)

5,000X (65° ANGLE)

1000X (65° ANGLE)

METHOD OF CHANGING THE PHYSICAL PROPERTIES OF A METALLIC FILM BY ION BEAM FORMATION

This is a division of application Ser. No. 899,242 filed Dec. 30, 1969, now U.S. Pat. No. 3,682,729.

When molybdenum is deposited on a substrate or an insulating layer on the substrate by sputtering or pyrolytic deposition, the deposited film has a relatively high yield stress. As a result of this relatively high yield stress, the film of molybdenum is more vulnerable to attack by an outside energy source. Thus, a deposited molybdenum film normally corrodes due to the presence of any moisture.

Accordingly while molybdenum is a good conductor of electricity because of its relatively low resistivity, the use of molybdenum to form metallic lands in a fabricated integrated circuit has not previously been employed because of the inability of the metallic film to resist corrosion. Thus, aluminum has been employed to form the first level metallic lands in a fabricated integrated circuit.

However, as the current density has increased, an electronic migration problem has occurred in the deposited aluminum whereby aluminum has ceased to be an effective conductor for high current density. Since molybdenum is not subjected to the electronic migration problem, it is capable of handling currents having a high density such as $10^6$ amps/cm for 1,000 hours, for example. Thus, molybdenum is capable of replacing aluminum as the metallic lands for an integrated circuit if molybdenum is not subjected to corrosion or deterioration by an outside energy source.

The present invention satisfactorily overcomes the foregoing problem by utilizing a method in which the deposited molybdenum film is bombarded by high energy ions to substantially change the yield stress of the deposited molybdenum film. This substantial decrease in the yield stress has resulted in the molybdenum film not being subjected to corrosion even in high humidity areas while the resistivity of the material is only slightly increased.

Therefore, the molybdenum film still retains the desired feature of being a good electrical conductor when it has been bombarded by ions in accordance with the method of the present invention while not subjected to corrosion. Accordingly, a film of molybdenum may readily be utilized to form metallic lands on a semiconductor substrate whenever the film has been bombarded by high energy ions in accordance with the method of the present invention.

In forming the metallic lands on a substrate, it has previously been necessary to deposit the metal over the entire surface of the substrate and then to etch away the areas of metallic film that are not to be employed as part of the conducting pattern. This type of arrangement has required the use of the photoresist technique or other means of forming a mask.

With the present invention, the requirement of a mask to delineate the conducting pattern of the metallic lands can be eliminated. This is accomplished by directing the ion beam only to the areas that are to function as part of the metallic lands. Thus, the ion beam will be controlled so that it is only directed against the areas, which are to function as metallic lands, and not applied to the entire area of the film so as to require a mask.

In the formation of various geometry to fabricate an integrated circuit, a molybdenum film has previously been used as a mask to protect the surface of the substrate or the silicon dioxide on the surface of the substrate. Thus, by forming openings in the mask of molybdenum, a dopant impurity has been implanted through the mask into the substrate to form a region in the substrate having a specific type of conductivity.

The openings in the molybdenum mask have been formed be utilizing an etchant to remove the molybdenum film in the areas in which the dopant impurity is to be implanted into the substrate. In this type of etching, there is a tendency for the film to etch with an undercut. As a result, precise control of the implanted region in the substrate is not obtained.

It has been found that any area of molybdenum film that has been bombarded by high energy ions in accordance with the method of the present invention is resistant to the etchant that reacts with the non-bombarded areas of the molybdenum film. Thus, when the etchant is applied to a molybdenum film that has had areas bombarded by high energy ions, only the non-bombarded areas are removed by the etchant.

Furthermore, a vertical edge is formed between an area of the molybdenum film, which has been bombarded with the ions, and an area of the molybdenum film, which has not been bombarded with the ions, when the entire molybdenum film is subjected to an etchant that reacts with the non-bombarded molybdenum film. The formation of the vertical edge between the etched area and the non-etched area eliminates any undercut in the openings formed in the molybdenum mask so that the undercut problem is eliminated by the present invention. Accordingly, a more precise control of the geometry of an integrated circuit is obtained when utilizing a molybdenum mask in which the molybdenum film forming the mask has been bombarded by ions in the areas, which are not to be removed, by the method of the present invention.

In the formation of ohmic contacts to a very shallow semiconductor region such as the emitter, it is difficult to obtain a good uniform ohmic contact between the very shallow emitter and the metal forming the contact. This is because the metal of the contact tends to penetrate through the emitter during an alloying or sintering operation due to the emitter being so thin.

The present invention satisfactorily provides a good uniform ohmic contact with any semiconductor material including a very shallow emitter region, for example. In the present invention, the metal, which is to form the contact, is deposited on the semiconductor material by evaporation, for example, and without any heat treatment such as sintering or alloying. Thus, there is no actual contact formed between the semiconductor material and the deposited metal during the deposition of the metal.

By utilizing high energy ions, sufficient energy is transmitted to the deposited metal in non-thermal equilibrium to cause the metallic ions of the deposited metal to penetrate the silicon surface and form a microalloy at the interface between the semiconductor material and the deposited metal. This produces an extremely uniform contact since the process is not thermally activated so that the interface between the semiconductor material and the metal is not of extreme importance.

By utilizing the method of the present invention, ohmic contacts to the various regions of conductivity in the substrate can be formed simultaneously with the metallic lands. Thus, it is only necessary to form the required openings in the electrically insulating layer and then deposit the metallic film over the entire surface of the insulating layer including depositing metal within the openings in the insulating layer. Then, by bombarding the ohmic contact areas and the areas that are to form the metallic lands with high energy ions in accordance with the method of the present invention, the metallic contacts make good ohmic contact with the various regions of different conductivity of the substrate while the bombarded portions of the metallic film form lands that are not subject to corrosion. Of course, the ohmic contacts also would not be subject to corrosion since they also are bombarded by the high energy ions.

When the semiconductor material of the substrate is germanium, it is necessary to use different metals for ohmic contacts with the N and P conductivity regions. For example, silver can be used as the ohmic contact with the N region of a germanium substrate while aluminum can be employed as the ohmic contact for the P region. Since silver requires a higher temperature for the silver to penetrate the germanium than the temperature necessary for the aluminum to penetrate the germanium, there must be two separate processing steps to cause silver and aluminum to penetrate the N and P regions, respectively, of the germanium substrate.

This results in silver, which requires the higher temperature, being initially alloyed into the N regions of the germanium substrate. Then, at a lower temperature, aluminum is driven into the P regions of the germanium substrate. It should be understood that silver and aluminum must be deposited on the N and P regions, respectively, by evaporation, for example.

By employing the method of the present invention, the problem of different alloying or sintering temperaures of the diffusion metals with germanium is eliminated. Thus, in the present invention, it is only necessary to evaporate aluminum and silver separately on the P and N regions, respectively, of the germanium substrate. Then, both the silver and aluminum films can be simultaneously bombarded with inert ions at a high energy level in accordance with the method of the present invention to provide ohmic contacts of silver with the N regions and aluminum with the P regions.

While this utilization of the present invention with a semiconductor material requiring two different metals for ohmic contacts to the N and P regions has referred to germanium as the semiconductor material, it should be understood that the same method could be employed with any other semiconductor material requiring two different metals for its ohmic contacts to the N and P regions.

When the metallic film on an electrically insulated layer is bombarded with high energy ions in accordance with the method of the present invention, there is an intermixing of the adjacent portions of the film of metal and the insulating layer in the same manner as previously mentioned for forming the good ohmic contact between the film of molybdenum and the substrate. This same type of intermixing or formation of an allow between molybdenum and the substrate occurs between molybdenum and an insulating layer such as silicon dioxide, for example.

This type of intermixing is not limited to molybdenum but would occur with any metallic film subjected to high energy ions in accordance with the method of the present invention. Accordingly, the adhesion of a metallic film to an insulating layer is increased by the method of the present invention.

This increase of adhesion occurs for various metals including copper. The adhesion of copper to an insulating layer such as silicon dioxide, for example, has previously been accomplished by utilizing a third metal such as chrome, for example, between copper and the insulating layer. Thus, when employing the method of the present invention, the requirement for a third material as an adhesive between the metallic film and the insulating layer is eliminated.

An object of this invention is to provide a method of removing or reducing the residual stress of a deposited metallic film.

Another object of this invention is to provide a method to substantially increase the etch resistance of a metallic film without substantially increasing the sheet resistance.

A further object of this invention is to provide a method to improve the mechanical properties of a metallic film.

Still another object of this invention is to provide a method for adhering a metallic film directly to an electrically insulating layer on a substrate without any adhesive material.

A still further object of this invention is to provide a semiconductor device in which the ohmic contacts are formed on the device in non-thermal equilibrium.

Yet another object of this invention is to provide a method of forming a mask in which the openings in the mask have straight vertical edges.

A yet further object of this invention is to provide a semiconductor device in which a metallic land is directly adhered to the electrically insulating layer of the substrate without any adhesive material therebetween.

The foregoing and other objects, features, and advantages of the invention will be more apparent from the following more particular description of the preferred embodiments of the invention as illustrated in the accompanying drawings.

Figure 1:
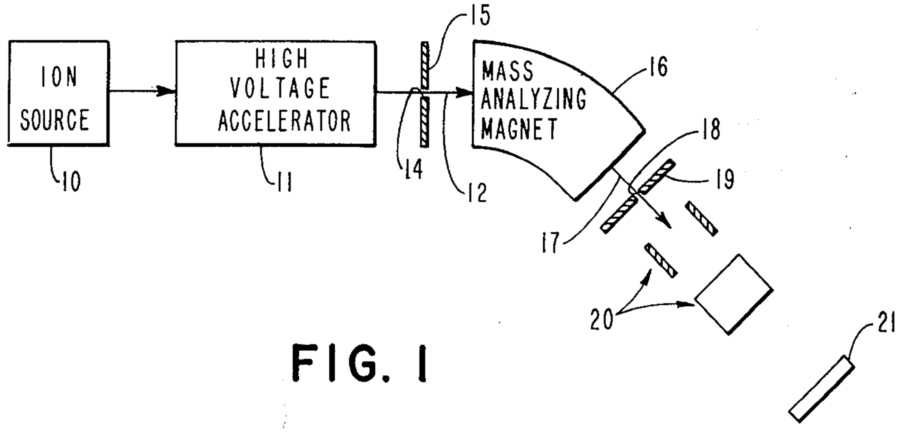
FIG. 1 is a diagramatic view of an apparatus for ion acceleration suitable for use in carrying out the method of the present invention.

Referring to the drawings and particularly FIG. 1, there is shown an ion source 10 in which atoms of at least one element are ionized in the well-known manner to supply ions therefrom. The elements are preferably selected from the group ranging between helium and argon although ions of a lighter or heavier mass could be employed if desired.

The ions from the ion source 10 are accelerated by a potential gradient through a high voltage accelerator 11 to the desired energy level. The specific energy level depends upon the thickness of the film and the element from which the ions are formed.

The ions form a beam 12, which passes from the accelerator 11 through a slit 14 in a plate 15. The ion beam 12 is then directed into a mass analyzing magnet 16.

In the mass analyzing magnet 16, only one species of the ions having a single energy is selected. Then, these selected ions exit from the mass analyzing magnet 16 as a beam 17.

The beam 17 next passes through a slit 18 in a plate 19 before being directed between beam steering deflection plates 20. The deflection plates 20 are preferably electrostatic.

The beam steering deflection plates 20 cause the beam 17 to strike a target 21 in a desired area. The target 21 may be a substrate having a metallic flim thereon, for example. By the use of the deflection plates 20, the beam 17 may be steered to different areas of the metallic film that is to be bombarded.

Likewise, the beam 17 could be focused over the entire area of the target 21, and a suitable mask interposed in front of the target 21. The mask would have openings therein to allow the beam 17 to be directed only to the areas that are to be bombarded with the ions. It should be understood that the entire structure of FIG. 1 is disposed within a vacuum.

In one example in which a molybdenum film was bombarded with ions, a molybdenum film having a thickness of approximately 3000 to 7000A was sputtered onto a layer of silicon dioxide on a silicon wafer. Singly ionized boron atoms with a molecular weight of 11 and a total ion dose of approximately $6 \times 10^{15}$ ions/cm$^2$ were directed against the molybdenum film with an energy of 290 Kev at a temperature of 20° C. An attempt was then made to etch the molybdenum film from the remainder of the wafer. An etchant of one part by volume of a solution consisting of 4 parts $HNO_3$, 80 parts $H_3PO_4$, and 16 parts de-ionized $H_2O$ in an ultrasonic bath at 40° C. by volume with one part by volume of $HNO_3$ was used. The areas in which the ion beam impinged on the wafer could not be etched with this etchant which is normally capable of removing molybdenum film.

In some of the examples to be set forth hereinafter, a semicircular wafer or substrate 22 (see FIG. 2) formed the target 21. A mask of molybdenum 23 was disposed between the wafer 22 and the ion beam 17.

Figure 2:
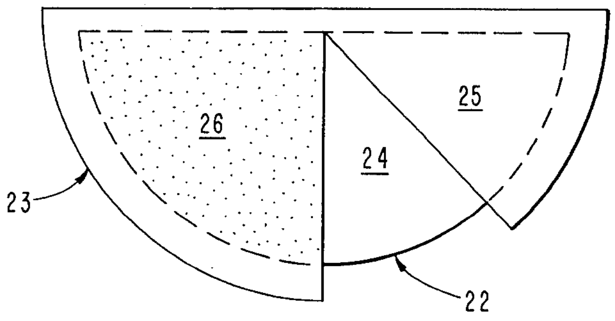
FIG. 2 is a schematic elevational view of a wafer or substrate and a mask employed together to form the samples for some of the tests in the present invention.

The ion beam 17 traveled perpendicular to the plane of FIG. 2 and struck the wafer 22 in an area 24, which was not covered by the mask 23 due to the mask 23 having an open area. The mask 23 has a solid portion 25 on one side of the open area. The mask 23 has a portion 26, which is formed with a plurality of openings of a small diameter such as 2 mils, for example, therein, on the other side of the open area.

Accordingly, the area 24 of the wafer 22 permits stress measurements of a bombarded area. The portion of the wafer 22 beneath the portion 25 of the mask 23 permits stress measurements of a non-bombarded area of the wafer 22.

The portion of the wafer 22 beneath the portion 26 of the mask 23 is used for etching purposes. Thus, the pattern in the portion 26 of the mask 23 produces a plurality of pads having a diameter of 2 mils that have been bombarded while the remainder of the area of the wafer 22 beneath the portion 26 of the mask 23 is non-bombarded. Therefore, etching the entire area beneath the portion 26 of the mask 23 enables the rate of etch of the bombarded and non-bombarded areas of the metallic film on the wafer 22 to be ascertained.

While the mask 23 was formed of molybdenum, it could be formed of any suitable material. Thus, it could be formed of silicon dioxide, for example.

In a test in which the arrangement of FIG. 2 was used, samples of pyrolytic molybdenum were bombarded with ions in some areas while other areas were not bombarded. The bombarded areas were bombarded with boron ions at 120 Kev and at 250 Kev with a dose of $10^{16}$ ions/cm$^2$ and nitrogen ions at 70 Kev with a dose of $10^{16}$ ions/cm$^2$.

X-ray diffractometry, reflection electron diffraction, and transmission electron microscopy were used to obtain a structural comparison of the bombarded and non-bombarded areas. In the non-bombarded area, a uniform stress between 60,000 and 80,000 p.s.i. was present in the pyrolytic molybdenum film with a slight indication of a non-uniform strain and deformation faults. As measured by X-ray diffraction, the crystalline size was in the insensitive range between 1000A and 8000A.

All of the bombarded areas of the samples showed a substantially uniform relief of stress with the stress varying from nearly zero to about 8,000 p.s.i. By broadening the x-ray lines, line analysis revealed the presence of a non-uniform stress in the bombarded areas together with a low density of deformation faults.

By means of electron microscopy, the bombarded areas showed a much higher density of dislocation loops than the non-bombarded areas. Thus, there is a rearrangement of the structure due to dislocations which apparently relieve the uniform strain while introducing a non-uniform strain.

In another test in which the arrangement of FIG. 2 was employed, areas of pyrolytic molybdenum on a silicon dioxide layer on a silicon wafer and pyrolytic molybdenum on a fused quartz were subjected to bombardment in some areas by nitrogen ions with an energy of 70 Kev and a dose of $10^{16}$ ions/cm$^2$.

For the molybdenum film on the silicon wafer with the silicon dioxide layer, the stress in the non-bombarded areas was about 54,000 p.s.i. while the bombarded areas indicated a stress of about zero.

In the pyrolytic molybdenum on fused quartz, the stress in the non-bombarded areas was approximately 150,000 p.s.i. while the stress in the bombarded areas was 80,000 p.s.i. Thus, while the stress in the pyrolytic molybdenum on the fused quartz sample was substantially greater than the stress in the pyrolytic molybdenum on the silicon dioxide layer on the silicon wafer, there is still a substantial reduction in the stress in the bombarded areas. This stress reduction is approximately 50%.

In another test, sputtered molybdenum on a silicon wafer having a thermal silicon dioxide layer thereon was bombarded by ions by the use of the mask 23 as shown in FIG. 2. The samples, which had pads of molybdenum with a diameter of 2 mils, were submitted for scanning electron miscroscopy after etching.

Figure 6:
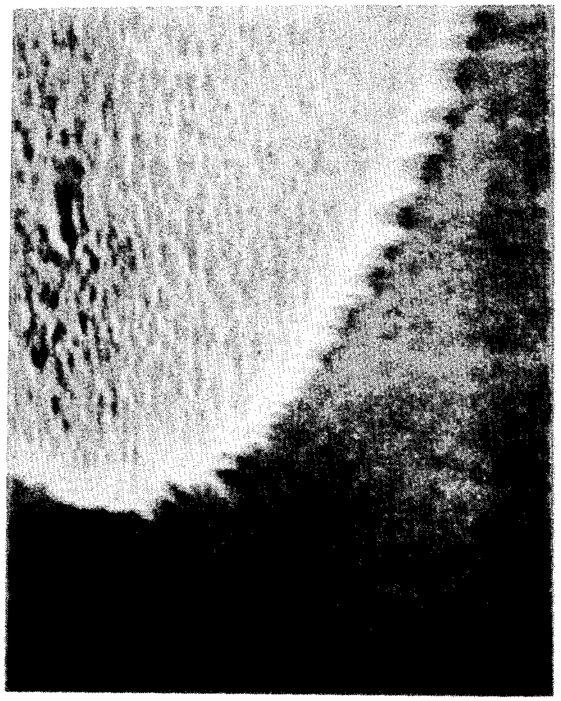
FIG. 6 is a scanning electron microscope photograph showing the edge of the pad of FIG. 5 at a magnification of 10,000 and with the pad at the same angle of 75°.
Figure 5:
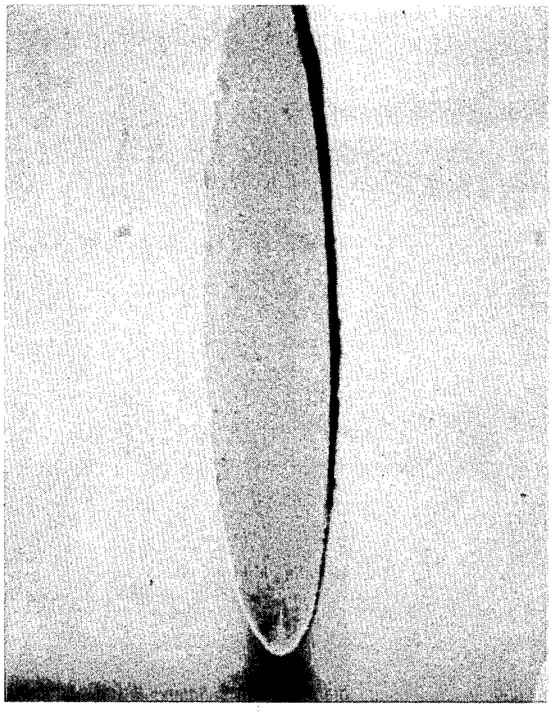
FIG. 5 is a scanning electron microscope photograph showing a molybdenum pad at a magnification of 1800 with the sample tilted at an angle of 75° with respect to the incident beam to obtain a better view of the pad.
Figure 8:
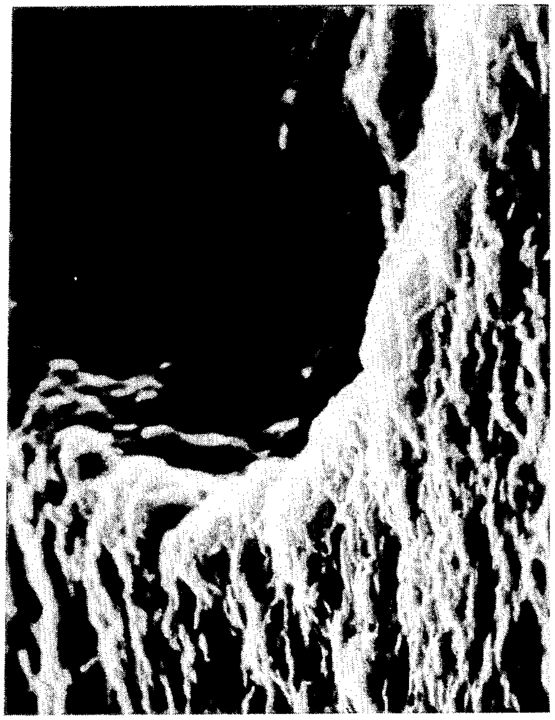
FIG. 8 is a scanning electron microscope photograph of a portion of the opening or hole in the mask of FIG. 7 with the mask tilted at the same angle of 65° and magnified 5000 times.
Figure 7:
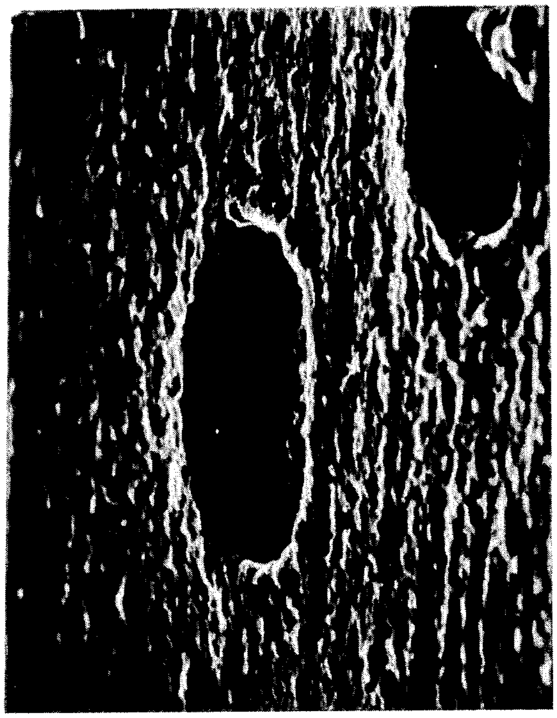
FIG. 7 is a scanning electron microscope photograph showing the opening in the mask through which one of the pads is formed with the mask tilted at an angle of 65° to the incident beam and magnified 1000 times.

As shown in FIGS. 5 and 6, the edge of the pad is perpendicular to the surfaces of the pads although the edge does not have a smooth contour. As shown in FIGS. 7 and 8, the hole in the mask is the cause for the pad not having a smooth contour at its edge. These photographs clearly revealed that no undercutting or rounding off of the edge of the molybdenum pad is apparent.

In another test, samples of pyrolytic molybdenum on a thermal silicon dioxide layer on a silicon wafer and pyrolytic molybdenum on fused quartz had one area non-bombarded, a second area bombarded by helium ions having a dose of $10^{16}$ ions/cm$^2$ with an energy of 35 Kev, and a third area bombarded by helium ions of the same dose as bombarded the second area with an energy of 80 Kev. Thus, three areas of each sample were examined.

It was determined by X-ray analysis that the stress in the non-bombarded area for the molybdenum on the silicon wafer having the silicon dioxide layer thereon was 90,000 p.s.i. while the 36 Kev area had a stress of 70,000 p.s.i. and the 80 Kev area had a stress of 50,000 p.s.i. There seemed to be a lower dislocation loop density than previously found for nitrogen or boron ions.

The samples of pyrolytic molybdenum on fused quartz had a stress in the non-bombarded area of 190,000 p.s.i., a stress in the 36 Kev area of 165,000 p.s.i., and a stress in the 80 Kev area of 159,000 p.s.i. Thus, while the stress levels of all areas of the sample having molybdenum on fused quartz was very high, there was a reduction in the stress as the ion energy increased. However, it is believed that the sample of pyrolytic molybdenum on the fused quartz would corrode even after being subjected to bombardment by 80 Kev hydrogen ions.

In another test using the arrangement of FIG. 2, three samples of pyrolytic molybdenum on a silicon dioxide layer on a silicon wafer were tested. Each of these samples had some areas bombarded and other areas not bombarded.

In the first sample, the thickness of the molybdenum was 3500A, and it was subjected to argon ions having a dose of $10^{16}$ ions/cm$^2$ with an energy of 280 Kev. The second sample had a thickness of molybdenum of 10,000A that was bombarded with argon ions having a dose of $10^{16}$ ions/cm$^2$ with an energy of 80 Kev. The third sample, which also had a thickness of molybdenum of 10,000A, was bombarded by argon ions having a dose of $10^{16}$ ions/cm$^2$ with an energy of 280 Kev.

In the first and third samples, the non-bombarded area had a stress level of about 90,000 p.s.i. while the bombarded area was almost completely relieved of stress. However, there was a non-uniform strain in the bombarded areas of each of the first and third samples.

The second sample also had a stress of about 90,000 p.s.i. in the non-bombarded area. However, the stress in the bombarded area of the second sample was about 60,000 p.s.i. Thus, while there was a reduction in the stress in the second sample, it was not as significant as in the first and third samples because of the lower energy level of the argon ions.

In another test, samples of aluminum film having a thickness of 5000 to 6000A and deposited on a silicon substrate were bombarded by ions. The ions were single charged boron, neon, nitrogen, and arsenic having energies in the range of 57 to 60 Kev and a dose of $10^{16}$ ions/cm$^2$. The change in resistivity in the bombarded areas of the samples ranged from 0 to about 5%.

The bombarded areas did not etch in an etchant solution by volume of 80 parts $H_3PO_4$, 4 parts $HNO_3$, and 10 parts de-ionized water although this etchant solution normally etches aluminum. Even after the samples were subjected to annealing in nitrogen at a temperature of 550° C. for 15 minutes, the bombarded areas still retained their non-etchability.

The foregoing property changes were observed irrespective of the species of the ions employed. This implies that the damage effect of the ions dominates the change of the property of the film over any chemical effect.

In another test, a polished silicon wafer having a diameter of 1½ inches and of P type conductivity with a resistivity of 1 ohm-cm had a layer of silicon dioxide of approximately 3700A thickness grown thereon. This layer was thermally grown on the wafer, which had a thickness of 6 to 8 mils, in an oxygen and steam ambient at 970° C.

Copper was then evaporated on the surface of the wafer by thermal evaporation to produce a film of copper having a thickness of approximately 1000A. During the evaporation, the temperature of the silicon wafer was maintained at 200° C.

A portion of the wafer having the copper film thereon was bombarded with singly ionized neon atoms with molecular weight of 20 and having a concentration of $10^{16}$ ions/cm$^2$ and an energy of 100 Kev at room temperature. Another portion of the wafer having the copper film thereon was not bombarded.

After bombardment, standard household transparent tape was placed on the wafer and subsequently peeled off to determine the relative adhesion of the bombarded and non-bombarded areas of the copper film to the silicon dioxide surface. In the non-bombarded areas, the adhesion of the copper to the silicon dioxide was poor and the copper film was removed by the tape. This is the standard reaction of copper which is evaporated directly on a silicon dioxide surface. In the bombarded area, the copper film remained on the silicon dioxide surface when the tape was peeled off. Accordingly, with the same force applied to both the bombarded and non-bombarded areas, the foregoing test shows that the bombarded area of copper had its adhesion to the silicon dioxide layer substantially increased.

Figure 3:
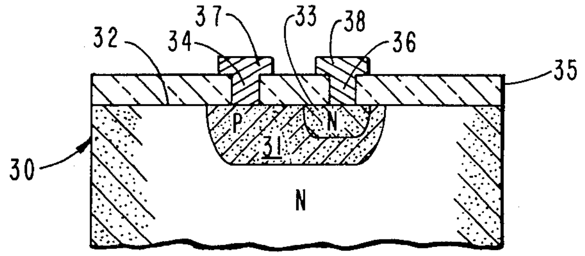
FIG. 3 is a sectional view of a semiconductor device having its ohmic contacts and metallic lands formed in accordance with the method of the present invention.

Referring to FIG. 3, there is shown a substrate 30 of silicon, for example, and of N type conductivity, for example. The substrate 30 has a region 31 of opposite conductivity, P type conductivity, therein and in communication with surface 32 of the substrate 30. The region 31 has a region 33 of N type conductivity formed therein and communicating with the surface 32 of the substrate 30.

The region 31 has an ohmic contact 34 in communication therewith and extending through an opening in an electrically insulating layer 35 such as silicon dioxide, for example, on the surface 32 of the substrate 30. The ohmic contact 34 is formed of a metal that has been bombarded in non-thermal equilibrium by ions having an energy of at least 10 Kev in accordance with the method of the present invention.

Likewise, the region 33 has an ohmic contact 36 extending through an opening in the silicon dioxide layer 35. The ohmic contact 36 is formed in the same manner as the ohmic contact 34. The ohmic contacts 34 and 36 can be formed of molybdenum or aluminum, for example, and have the desired good electrical contact with the regions 31 and 33, respectively.

If desired, the ohmic contacts 34 and 36 can have metallic lands 37 and 38 formed integral therewith and of the same material. The metallic lands 37 and 38 will be bombarded by the method of the present invention at the same time that the ohmic contacts 34 and 36 are bombarded in accordance with the method of the present invention.

Accordingly, the method of the present invention permits a semiconductor device of the type shown in FIG. 3 to be formed. This enables good ohmic contacts to be made and also permits metallic lands to be integral with the ohmic contacts if desired.

Figure 4:
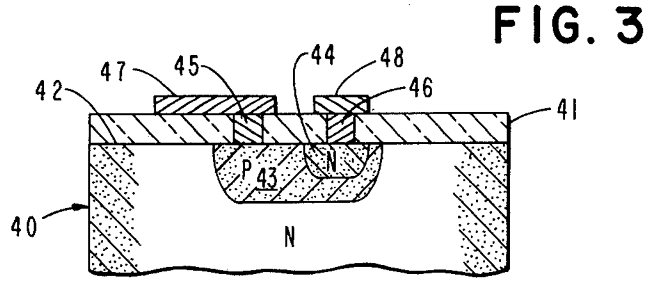
FIG. 4 is a sectional view of a semiconductor device having its metallic lands adhered to the electrical insulating layer on the substrate forming the semiconductor device without any adhesive in accordance with the method of the present invention.

Referring to FIG. 4, there is shown a substrate 40 of silicon, for example, and of N conductivity, for example. The substrate 40 has a layer 41 of electrical insulating material such as silicon dioxide, for example, on its surface 42.

The substrate 40 has a region 43 of opposite conductivity to the conductivity of the substrate 40 formed therein and communicating with the surface 42. The region 43, which is P type conductivity, has a region 44 of the opposite type of conductivity to the region 43 formed therein. Thus, the region 44 is of N type conductivity.

The region 43 has an ohmic contact 45, which extends through an opening in the silicon dioxide layer 41, in good electrical contact therewith. The ohmic contact 45 may be formed in accordance with the method of the present invention or by any other suitable means or method.

Likewise, the region 44 has an ohmic contact 46, which extends through an opening in the layer 41 of silicon dioxide, in good electrical contact therewith. The ohmic contact 46 may be formed in accordance with the method of the present invention or by any other suitable means or method.

A metallic land 47, which is preferably formed of copper, is disposed on the surface of the layer 41 of silicon dioxide and makes electrical contact with the ohmic contact 45. The metallic land 47 has been bombarded in non-thermal equilibrium by ions having an energy of at least 10 Kev in accordance with the method of the present invention. Accordingly, the metallic land 47 adheres to the layer 41 of silicon dioxide without any adhesive therebetween.

The ohmic contact 46 has a metallic land 48, which is preferably formed of copper, in good electrical contact therewith and disposed on the surface of the layer 41 of silicon dioxide. The metallic land 48 has been bombarded in the same manner as the metallic land 47 so that it also adheres to the layer 41 of silicon dioxide without any adhesive therebetween.

Accordingly, the method of the present invention permits a semiconductor device to be formed of the type shown in FIG. 4. This eliminates the necessity for any type of adhesive between the metallic lands 47 and 48 and the surface of the silicon dioxide layer 41.

An advantage of this invention is that it eliminates the corrosive feature of deposited molybdenum film. Another advantage of this invention is that a metallic film can be etched without any undercut so that straight openings are provided therein. A further advantage of this invention is that it eliminates the need for a mask to form metallic lands on a substrate.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of forming an ohmic contact with a semiconductor material consisting essentially of:
- depositing an insulating layer on a semiconductor substrate;
- forming at least one opening in the insulating layer;
- depositing a metallic film in at least the opening for contact with the substrate; and
- bombarding at least the portion of the film deposited in the opening with high energy ions having an energy of at least 10 Kev;
- said ions selected from the group of ions consisting of boron, nitrogen, helium, argon, arsenic and neon.

2. The method according to claim 1 in which the metal of the film is molybdenum.

3. A method as in claim 1 wherein said metallic film is selected from the group of metals consisting of aluminum, copper and silver.

4. A method of forming ohmic contacts of silver and aluminum on N and P type regions, respectively, of a germanium substrate comprising:
- depositing said silver and aluminum on said respective N and P type regions;
- bombarding said silver and aluminum films with ions having an energy of at least 10 Kev;
- said ions being selected from the group of ions consisting of boron, nitrogen, helium, argon, arsenic and neon.

5. A method for increasing the adhesion of a layer of copper to a layer of silicon dioxide comprising:
- bombarding the copper with high energy ions having an energy of at least 10 Kev;
- said ions being selected from a group of ions consisting of boron, nitrogen, helium, argon, arsenic and neon.

6. A method for reducing the yield stress of a molybdenum film which is deposited on a substrate comprising:
- bombarding the molybdenum with high energy ions having an energy of at least 10 Kev;
- said ions being selected from the group of ions consisting of boron, nitrogen, helium, argon, arsenic and neon.

* * * * *